United States Patent [19]

Bergerioux

[11] Patent Number: 5,506,036
[45] Date of Patent: Apr. 9, 1996

[54] EASY-TO-RECYCLE LAMINATED MATERIAL FOR PACKAGING USE

[75] Inventor: Claude Bergerioux, Shizuoka, Japan

[73] Assignee: AB Tetra Pak, Lund, Sweden

[21] Appl. No.: 286,426

[22] Filed: Aug. 5, 1994

Related U.S. Application Data

[63] Continuation-in-part of Ser. No. 939,653, Sep. 3, 1992, abandoned.

[30] Foreign Application Priority Data

Sep. 4, 1991 [JP] Japan .................................. 3-254723

[51] Int. Cl.$^6$ ............... B32B 27/08; B32B 27/10; B32B 27/30; B32B 7/06
[52] U.S. Cl. ................ 428/213; 428/34.2; 428/35.4; 428/35.9; 428/36.7; 428/220; 428/464; 428/476.1; 428/481; 428/483; 428/513; 428/514; 428/518; 428/520; 428/698; 428/702
[58] Field of Search .................... 428/34.2, 518, 428/520, 511, 513, 702, 514, 215, 481, 483, 475.8, 476.1, 476.3, 464, 458, 461, 220, 36.6, 36.7, 35.7, 35.4, 35.9, 213, 698, 537.5

[56] References Cited

U.S. PATENT DOCUMENTS

| | | | |
|---|---|---|---|
| 4,239,826 | 12/1980 | Knott, II et al. | 428/36.7 |
| 4,701,360 | 10/1987 | Gibbons et al. | 428/34.2 |
| 4,789,575 | 12/1988 | Gibbons et al. | 428/511 |
| 4,948,640 | 8/1990 | Gibbons et al. | 428/518 |
| 4,981,739 | 1/1991 | Gibbons et al. | 428/34.2 |
| 4,988,546 | 1/1991 | Tanner et al. | 428/511 |
| 5,057,359 | 10/1991 | Merdem et al. | 428/518 |
| 5,085,904 | 2/1992 | Deak et al. | 428/36.6 |
| 5,116,649 | 5/1992 | Massouda | 428/34.2 |
| 5,122,410 | 6/1992 | Löfgren et al. | 428/702 |
| 5,230,948 | 7/1993 | Preiss et al. | 428/36.7 |
| 5,441,805 | 8/1995 | Kwok | 428/36.6 |

FOREIGN PATENT DOCUMENTS

| | | |
|---|---|---|
| 1139339 | 5/1989 | Japan . |
| 2139334 | 5/1990 | Japan . |

Primary Examiner—Ellis P. Robinson
Assistant Examiner—Rena L. Dye
Attorney, Agent, or Firm—Birch, Stewart, Kolasch & Birch

[57] ABSTRACT

A laminated material for packaging containers comprising polyvinyl alcohol or other water-soluble, thermoplastic resin layers disposed on both sides of a paperboard base material layer and other thermoplastic synthetic resin layers laminated thereon. An aluminum foil layer 5 may be provided over a polyolefin adhesive resin layer. The paper pulp can be readily separated from the polyethylene and other thermoplastic synthetic resins during the recycling process.

21 Claims, 2 Drawing Sheets

EASY-TO-RECYCLE LAMINATED MATERIAL FOR PACKAGING USE

This application is a continuation-in-part of application Ser. No. 07/939,653 filed on Sep. 3, 1992, now abandoned, the entire contents of which are hereby incorporated by reference.

BACKGROUND OF THE INVENTION

1. Field of the Invention

The present invention relates to laminated materials used to make containers, for example, liquid containers, wherein a paperboard base material is laminated with thermoplastic resins, such as polyvinyl alcohol and polyethylene, so that the used laminated containers are easy to recycle.

2. Prior Art

Conventionally, paper-made packaging containers called "pack" containers have been used for vending milk, juice, and other liquid foods. Laminated materials that use paper as the major material (packaging web) have been employed for making ordinary packaging for food that does not require long-term storage (for example, gable-top, sealed paper containers). As shown in FIG. 3, on one side of an ordinary supporting body of a paperboard base material layer 1, forming the outer surface of the container where printed information is provided, a thin thermoplastic synthetic resin layer 3 comprising polyethylene is directly laminated thereto, while on the other side of the paperboard base material layer 1, forming the inner surface of the container, a laminated material made of one or two laminated polyethylene layers with a specified thickness is applied as a liquid-resistant layer 4.

For containers requiring long-term storage after the sterile introduction of the liquid food (ordinarily in cubic form), as shown in FIG. 4, on one side of the supporting body of a paperboard base material layer 1, forming the outer surface of the container, a thin polyethylene layer 3 is directly laminated thereto, while on the other side forming the inner surface of the container, an aluminum foil layer 5 is formed over an adhesive resin layer 6 (ordinarily polyethylene). In turn, over the aluminum foil layer is laminated a material that is made of one or two laminated polyethylene layers to form a liquid-resistant layer 4. Such laminated materials for making packaging containers B1 and B2 are supplied in the form of a long roll with the necessary printed information and folding lines, to a packaging machine for making containers that are then filled with liquid foods.

In recent years, for the purpose of preventing loss of aroma of liquid foods introduced into a packaging container, due to adsorption of aroma by the inner surface of the container, and maintaining the rich aroma of food, laminated materials for packaging, for example, as disclosed by the present inventors in Japanese Patent Publication No. 139334/1990, are provided with a thin film of a silicon compound, such as silicon oxide or silicon nitride, on the innermost surface that contacts the liquid food, over an aluminum or other metal foil layer. A laminated material for packaging provided with an oil-proof function and the ability to withstand microwave heating of its contents without the occurrence of cracks in the sealed layers, and making blank formation possible, has been disclosed, for example, in Japanese Patent Laid-Open Publication No. 139339/1989, in which a sealed layer is provided in the form of an oil-proof paper layer on a paperboard base material layer.

A recent trend has been to recycle pulp and polyethylene and other components that are regenerated from the laminated materials of the containers.

The recycling process of used, empty packaging containers ordinarily starts by washing and shredding the containers with a shredder. The shredded material is then placed into a repulper containing hot water for separating the pulp from other components. The agitator in the repulper is operated so as to separate the pulp in the paperboard base material layer 1 from the polyethylene or from the polyethylene containing aluminum foil or other components. In this procedure, the shredded laminated materials are agitated in hot water in the repulper and pulp fibers in the paperboard base material layer are loosened and dispersed in the polyethylene. The loosened and dispersed pulp fibers are separated from the polyethylene and other components by filtering the mixture through a screen, which is linked to the repulper. The loosened and finely chopped fibers and polyethylene and other components remaining on the filter can then be removed.

As explained above, the shredded laminated materials are agitated in hot water and the pulp in the paperboard base material layer 1 is separated from the thermoplastic synthetic resin (3, 4 or 6), which is ordinarily polyethylene, that is laminated on both sides of the paperboard base material layer 1. In this operation, hot water permeates into the paperboard base material layer 1 to loosen and separate the portion thereof adhering to the thermoplastic resin. However, this loosening step requires time and energy. In addition, after hot water has penetrated into the paperboard base material layer 1, the thermoplastic synthetic resin layers (3, 4 or 6) that are laminated over the paperboard base material layer 1 contains entangled pulp fibers, which requires more time for the separation of pulp fiber and thermoplastic synthetic resin; wherein the separated thermoplastic synthetic resin that has been in contact with the paperboard base material layer 1 contains at least about 5% of residual pulp fibers.

SUMMARY OF THE INVENTION

An objective of the present invention is to provide laminated materials for packaging, wherein the pulp in the paperboard base material layer 1 can be separated from the thermoplastic synthetic resin that is laminated thereon, so that these components can be recycled for future use. A further objective is to obtain a separated thermoplastic synthetic resin that does not contain paper fibers.

To achieve the above objectives, a laminated material used for packaging and containers that do not require long-term storage has been provided according to the present invention. As can be seen by referring to FIG. 1, the laminated material comprises a paperboard base material layer 1 provided with polyvinyl alcohol or other water-soluble, thermoplastic resin layers 2 on both sides thereof. On the side forming the surface of the container on which printed information is provided, a thermoplastic synthetic resin 3, such as polyethylene, is thinly laminated. The printing information in this case is usually printed in the standard procedure before lamination of the thermoplastic synthetic resin 3, but printing after lamination is also possible. On the inner surface of the container, which is in contact with the liquid food, a liquid-resistant material layer 4 comprising a thermoplastic synthetic resin is laminated. Examples of the thermoplastic synthetic resin used to make liquid-resistant material layer 4 include polyethylene, polyethylene terephthalate (PET) and polyamide.

For manufacturing a package or container for long-term storage as shown in FIG. 2, a paperboard base material layer 1 is laminated on both sides with polyvinyl alcohol or other water-soluble, thermoplastic resin layers 2, and a thermoplastic synthetic resin 3, ordinarily polyethylene, is further thinly laminated on the side forming the outer surface of the container having printed information. Furthermore, on the surface of the polyvinyl alcohol or other water-soluble, thermoplastic resin layer 2 disposed on the side forming the inner surface of the container, there is provided a liquid-resistant material layer 4 comprising a thermoplastic synthetic resin at the outermost position contacting the liquid content, and between the liquid-resistant material layer 4 and the thermoplastic resin layer 2, there is provided a gas-barrier material layer 5, such as a metal foil or a gas-barrier synthetic resin film. Examples of the thermoplastic synthetic resin used to make liquid-resistant material layer 4 include polyethylene, polyethylene terephthalate (PET) and polyamide; examples of the metal foil include aluminum foil or iron oxide foil, and examples of the gas-barrier synthetic resin film include polyester films, polypropylene films and nylon films. The lamination of the gas-barrier material layer 5 onto the polyvinyl alcohol or other water-soluble, thermoplastic resin layer 2 may be facilitated by the use of a polyolefin layer 6 as an adhesive resin, interposed therebetween. Examples of the polyolefin include polyethylene, polypropylene and mixtures thereof.

For manufacturing laminated materials for packaging that possess an oil-proof function, a paperboard base material layer 1 with polyvinyl alcohol or other water-soluble, thermoplastic resin layers 2 laminated on both sides thereof, like the above cases, has a thermoplastic synthetic resin 3, ordinarily polyethylene, further thinly laminated on the side forming the outer surface of the container having printed information. Layer 4 may have a multilayer structure containing an oil-proof or other functional material layer further provided on the side forming the inner surface of the container outwardly of an optional adhesive resin layer 6, so that the inner surface contacting the liquid food is made thermally sealable, for example, by laminating a thermoplastic synthetic resin layer directly on an oil-proof paper, which includes oil-proof paper made from chemical pulp, wherein oil resistance is obtained by a high degree of beating. In the above description, polyethylene, PET or polyamide may be utilized as the laminated thermoplastic synthetic resin on the side adjoining the liquid food.

For manufacturing laminated materials for packaging that possess aroma-holding properties, a paperboard base material layer 1 with polyvinyl alcohol or other water-soluble, thermoplastic resin layers 2 laminated on both sides thereof, has a thermoplastic synthetic resin 3, such as polyethylene, thinly laminated on the side forming the outer surface of the container having printed information. Layer 4 may have a multilayer structure containing an aroma-holding layer provided on the side forming the inner surface of the container outwardly of an optional adhesive layer, a gas-barrier layer, and a thermoplastic synthetic resin layer, so that the inner surface contacting the liquid food is the aroma-holding layer. The gas-barrier layer may be an aluminum foil, an iron oxide foil, a polyester film, a polypropylene film or a nylon film.

The packaging containers manufactured by using such laminated materials are filled with liquid product and used by consumers. Then the used containers are collected for recycling and submitted to regenerating operations. After washing and shredding, the shredded materials are agitated in hot water in a repulper. The hot water readily permeates into the cut surface of the laminated materials to promptly dissolve the polyvinyl alcohol or other water-soluble, thermoplastic resin layers 2 that are laminated on both sides of the paperboard base material layer 1, so that the thermoplastic synthetic resin layers 3, 4 that are laminated on both sides of the layers 2 (see FIG. 1), or the thermoplastic synthetic resin layer 3 and the thermoplastic synthetic resins 4, 6 that are above and below the gas-barrier material layer 5 in FIG. 2, or the multilayer structure having an aroma-holding material layer or oil-proof material layer laminated outwardly of an optional adhesive resin layer 6, can be readily separated, making separation by agitation prompt. Furthermore, the resins do not contain residual fibers.

It is noted that lamination of polyvinyl alcohol or other water-soluble, thermoplastic resin on the paperboard base material layer 1 eliminates the roughness on the surface of the paperboard base material on the side of the container contacting the liquid food, which allows the next laminated materials to be readily adhered and solidly laminated.

BRIEF DESCRIPTION OF THE DRAWINGS

The present invention will become more fully understood from the detailed description given hereinbelow and the accompanying drawings, which are given by way of illustration only, and thus, are not limitative of the present invention, wherein.

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
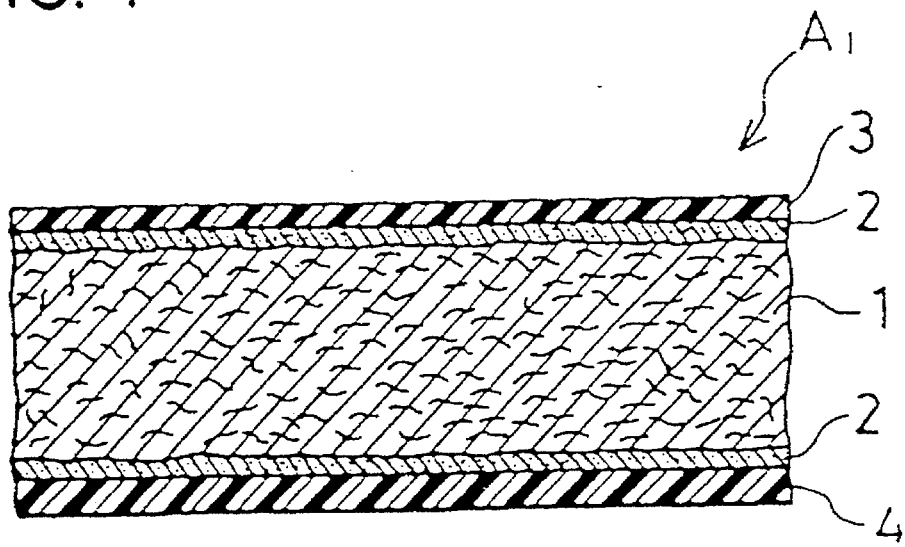
FIG. 1 is a partially enlarged sectional view of an easy-to-recycle laminated material for packaging liquid foods, which do not require a long storage time.

FIG. 1 shows, as an embodiment of the present invention, a laminated material A1 for packaging that does not require long-term storage, for example, gable-top sealed paper containers. To make the laminated material A1, polyvinyl alcohol layers 2 are laminated on both sides of a paperboard base material layer 1 in a specified thickness. Polyvinyl alcohol is a thermoplastic resin and is insoluble in ordinary solvents except water, exhibits liquid resistance to organic solvents other than water and is stable up to about 140° C. Polyvinyl alcohol has been used for making water-soluble films. Lamination with polyvinyl alcohol may be carried out utilizing 0.2 to 10 g of polyvinyl alcohol per square meter. Using more polyvinyl alcohol will make separation of the thermoplastic synthetic resin, which is polyethylene in the embodiment, from the paperboard base material layer 1 easier. In FIG. 1, on the polyvinyl alcohol layer 2 on the side of the paperboard base material layer that forms the outer side of the container bearing printed information (upper side in the figure), a polyethylene layer 3 with a specified thickness is laminated as a thermoplastic synthetic layer. In this case, printing on the laminated material is ordinarily carried out before laminating the layer 2 thereon, but it is also possible to apply printing on the outer surface of the polyethylene layer 3. On the side forming the inner surface (downside in the figure), a layer 4 of a thermoplastic synthetic resin of polyethylene, as a liquid-resistant material layer is laminated with a specified thickness that is thicker than the polyethylene layer 3 on the outer side of the container. Formation of the polyethylene layer 4 making up the liquid-resistant material layer, may be achieved by using two layers of polyethylene or by combining two different kinds of polyethylene, namely a linear low-density polyethylene, and low-density polyethylene so as to obtain a laminated layer with superior liquid-resistance that is free of crack formation. Due to the use of the polyvinyl alcohol layer, the inner surface of the paperboard base material layer 1 is smoother since roughness is eliminated, and the lamination of polyethylene thereon has better adhesion. The above laminated material A1 permits ready separation of the paper and polyethylene layers in recycling processes and thus profitable reuse of the polyethylene and of the paper pulp.

Figure 2:
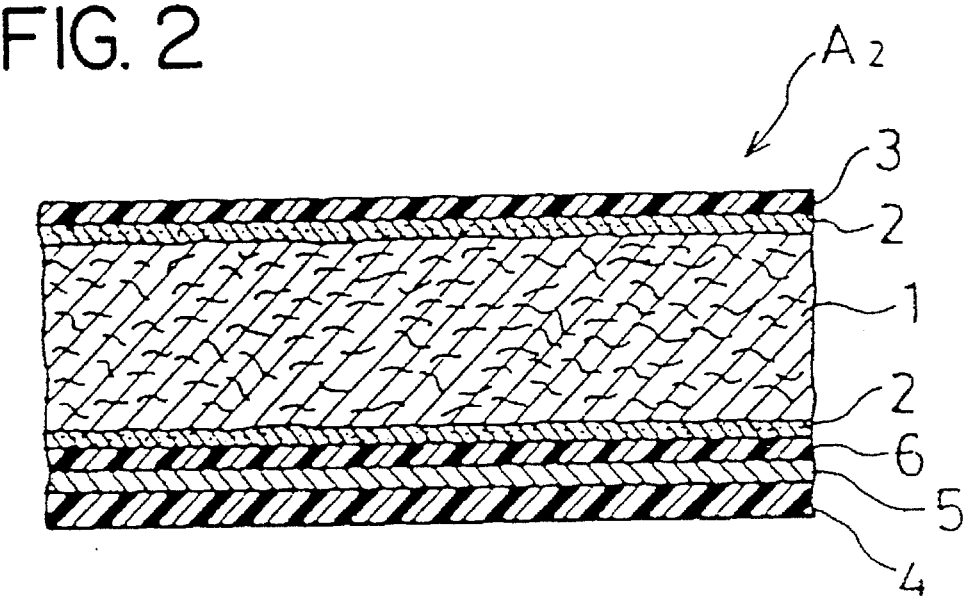
FIG. 2 is a partially enlarged sectional view of an easy-to-recycle laminated material for packaging liquid foods, which require a long storage time and thus possess a gas-barrier property.
Figure 3:
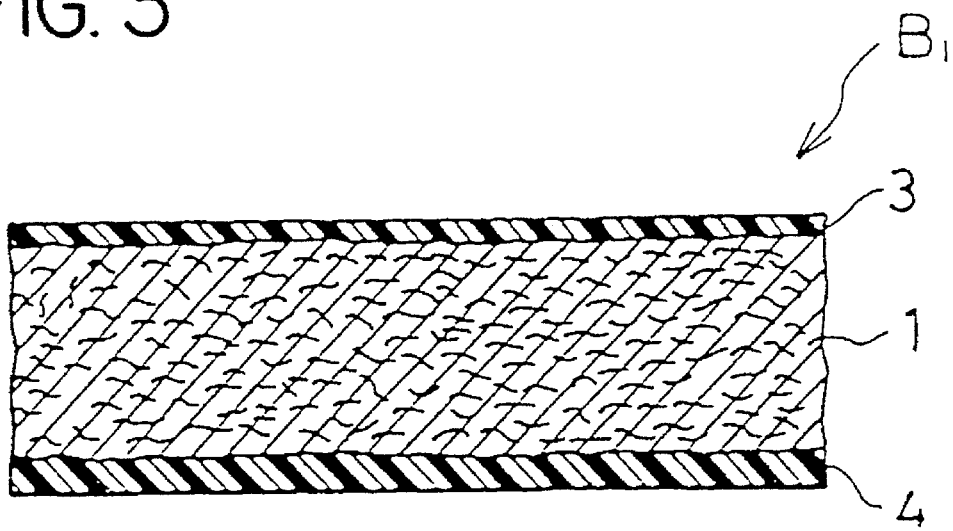
FIG. 3 is a partially enlarged sectional view of a conventional laminated material for packaging liquid foods, which do not require a long storage time.
Figure 4:
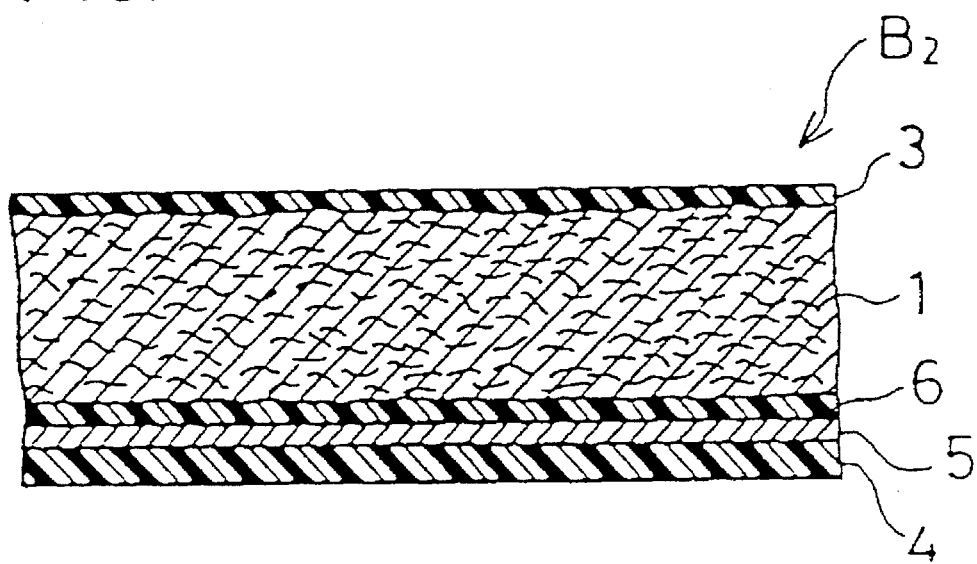
FIG. 4 is a partially enlarged sectional view of a conventional laminated material for packaging liquid foods, which require a long storage time and a gas-barrier property.

FIG. 2 shows a laminated material A2 as another embodiment of the present invention for packaging containers, which is effective for the long-term storage of food, after sterile filling (cubic, brick-form containers). The laminated material A2 is made first by laminating a polyvinyl alcohol layers 2 on both sides of the paperboard base material layer 1 with a specified thickness. A polyethylene layer 3, as a thermoplastic synthetic resin layer, is laminated onto the polyvinyl alcohol layer 2 on the side of the paperboard base material layer 1 that forms the outer side of the container having printed information thereon (upper side in the figure). On the inner side of the container (downside in the figure), a gas-barrier material layer 5 is laminated onto the polyvinyl alcohol layer 2, with an optional polyolefin layer 6 as an adhesive resin layer being formed therebetween. Examples of the gas-barrier material include metal foil such as aluminum foil or iron oxide foil. Other gas-barrier synthetic resin films such as polyester films, nylon films, polypropylene films, and any thermoplastic synthetic resin films having superior gas-barrier properties, may also be employed. A polyethylene layer 4 is also laminated on the surface of the aluminum foil layer 5. This polyethylene layer 4 may be formed, as described above, by combining two layers of polyethylene. The laminated material A2 exhibits a superior gas-barrier property and is profitable for use as a sterile package, while at the same time, is easily separated into the pulp and other components in the recycling process.

As a third embodiment of the present invention for packaging containers that possess an oil-proof function, polyvinyl alcohol layers 2 having a specified thickness are laminated on both sides of a paperboard base material layer 1. A polyethylene layer 3, as a thermoplastic synthetic resin layer, is laminated onto the polyvinyl alcohol layer 2 on the side of the paperboard base material layer 1 that forms the outer side of the container having printed information thereon. On the inner side of the container, an oil-proof layer is laminated onto the polyvinyl alcohol layer 2, with an optional polyolefin layer 6 as an adhesive resin layer being formed therebetween. The oil-proof layer may be made from chemical pulp. A polyethylene layer 4 is laminated on the surface of the oil-proof layer, wherein the polyethylene layer 4 may be formed by combining two layers of polyethylene. The laminated material made in this way exhibits a superior oil-proof property, and is easily separated into pulp and other components in the recycling process.

As a fourth embodiment of the present invention for packing containers possessing aroma-holding properties, polyvinyl alcohol layers 2 having a specified thickness are laminated on both sides of a paperboard base material layer 1. A polyethylene layer 3, as a thermoplastic synthetic resin layer, is laminated onto the polyvinyl alcohol layer 2 on the side of the paperboard base material layer 1 that forms the outer side of the container having printed information thereon. On the inner side of the container, a gas-barrier material layer, such as an aluminum foil layer, is laminated onto the polyvinyl alcohol layer 2 or an optional polyolefin layer that functions as an adhesive layer between the polyvinyl alcohol layer 2 and the gas-barrier material layer. A polyethylene layer is laminated on the surface of the gas-barrier material layer, wherein the polyethylene layer may be formed by combining two layers of polyethylene. Finally, an aroma-holding layer made of a silicon compound is laminated on the polyethylene layer, so that the aroma-holding layer contacts the liquid food. This laminated material exhibits superior aroma-holding properties, and is easily separated into pulp and other components in a recycling process.

In the embodiments of the present invention water-soluble polyvinyl alcohol layers are formed on both sides of the paperboard base material layer 1, below the outer, thermoplastic synthetic resin layers 3 and above thermoplastic synthetic resin layer 4 or 6, but other water-soluble, thermoplastic resins may also be employed.

The laminated material of the present invention is used in ordinary "pack" containers for milk, juice or other liquid foods that do not require a long storage time, and may be recycled after the contents have been consumed, where the separation of the paper pulp from the polyethylene and other thermoplastic synthetic resins laminated on the paperboard is easily and quickly achieved. At the same time, fibers do not remain in the polyethylene or other thermoplastic resins that are separated, so that it is possible to reuse both the paper pulp and polyethylene or other thermoplastic synthetic resins efficiently. In addition, the present invention makes it possible to laminate polyethylene or other thermoplastic synthetic resins readily and firmly on the rough surface of the paperboard base material prior to printing, during the manufacturing of the laminated material.

The laminated material of the present invention is used for packaging containers for the long-term storage of liquid foods after sterile filling, and may be recycled after the content has been consumed, wherein the separation of paper from polyethylene or other thermoplastic synthetic resins which are laminated on the paperboard base material easier.

The laminated material for packaging containers as defined by the present invention is used for liquid foods to prevent the loss of aroma and to maintain a rich fragrance. The laminated material for packaging containers possesses an oil-proof function, and in the recycling process, the pulp can be readily separated from the laminated material which contains various multilayer structures on the inner and outer sides of the paperboard base material.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A laminated material for a packaging container which comprises:
    a base layer of a paperboard base material having an inner and an outer surface;
    an outer layer of a polyethylene thermoplastic synthetic resin;
    a first separatory layer of a water-soluble polyvinyl alcohol thermoplastic resin laminated between the outer surface of the base layer and the outer layer so that the base layer and the outer layer are readily separable in a repulper;
    an inner layer of a thermoplastic synthetic resin selected from the group consisting of polyethylene, polyethylene terephthalate (PET) and polyamide; and
    a second separatory layer of a water-soluble polyvinyl alcohol thermoplastic resin laminated between the inner surface of the base layer and the inner layer so that the base layer and the inner layer are readily separable in the repulper.

2. The laminated material of claim 1, wherein the first and second separatory layers contain 0.2 to 10 grams of polyvinyl alcohol per square meter.

3. The laminated material of claim 1, wherein the inner layer is thicker than the outer layer.

4. The laminated material of claim 1, wherein an oil-proof paper made from chemical pulp is provided between the second separatory layer and the inner layer.

5. The laminated material of claim 4, wherein an adhesive layer of polyolefin is provided between the second separatory layer and the oil-proof paper.

6. The laminated material of claim 5, wherein said polyolefin is selected from the group consisting of polyethylene, polypropylene and mixtures thereof.

7. A laminated material for a packaging container which comprises:
    a base layer of a paperboard base material having an inner and an outer surface;
    an outer layer of a polyethylene thermoplastic synthetic resin;
    a first separatory layer of a water-soluble polyvinyl alcohol thermoplastic resin laminated between the outer surface of the base layer and the outer layer so that the base layer and the outer layer are readily separable in a repulper;
    a gas-barrier layer having an inner and an outer surface;
    a second separatory layer of a water-soluble polyvinyl alcohol thermoplastic resin laminated between the inner surface of the base layer and the outer surface of the gas-barrier layer so that the base layer and the gas-barrier layer are readily separable in the repulper; and
    an inner layer of a thermoplastic synthetic resin selected form the group consisting of polyethylene, polyethylene terephthalate (PET) and polyamide, which is laminated on the inner surface of the gas barrier layer.

8. The laminated material of claim 7, wherein an adhesive layer of polyolefin is provided between the gas-barrier layer and the second separatory layer so that the adhesive layer is readily separated from the base layer in the repulper.

9. The laminated material of claim 8, wherein said polyolefin is selected from the group consisting of polyethylene, polypropylene and mixtures thereof.

10. The laminated material of claim 7, wherein the first and second separatory layers contain 0.2 to 10 grams of polyvinyl alcohol per square meter.

11. The laminated material of claim 7, wherein the inner layer is thicker than the outer layer.

12. The laminated material of claim 7, wherein the gas-barrier layer is selected from the group consisting of an aluminum foil, an iron oxide foil, a polyester film, a polypropylene film and a nylon film.

13. The laminated material of claim 8, wherein the first and second separatory layers contain 0.2 to 10 grams of polyvinyl alcohol per square meter.

14. The laminated material of claim 8, wherein the inner layer is thicker than the outer layer.

15. The laminated material of claim 8, wherein the gas-barrier layer is selected from the group consisting of an aluminum foil, an iron oxide foil, a polyester film, a polypropylene film and a nylon film.

16. The laminated material of claim 7, wherein an innermost aroma-holding layer made of a silicon compound is provided on the inner layer on the side forming the inner surface of said packaging container.

17. The laminated material of claim 8, wherein an innermost aroma-holding layer made of a silicon compound is provided on the inner layer on the side forming the inner surface of said packaging container.

18. The laminated material of claim 12, wherein an innermost aroma-holding layer made of a silicon compound is provided on the inner layer on the side forming the inner surface of said packaging container.

19. The laminated material of claim 16, wherein said aroma-holding layer is made of a silicon compound selected from the group consisting of silicon oxide and silicon nitride.

20. The laminated material of claim 17, wherein said aroma-holding layer is made of a silicon compound selected from the group consisting of silicon oxide and silicon nitride.

21. The laminated material of claim 18, wherein said aroma-holding layer is made of a silicon compound selected from the group consisting of silicon oxide and silicon nitride.

* * * * *